Figure 1:
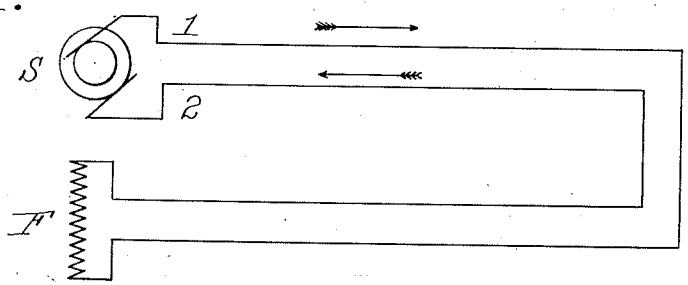

No. 874,411. PATENTED DEC. 24, 1907.
M. LEBLANC.
SYSTEM OF ELECTRICAL TRANSMISSION AND PROPULSION.
APPLICATION FILED MAR. 31, 1904.

3 SHEETS—SHEET 1.

Witnesses:
Edwin L. Yewell.
F. T. Chapman.

Inventor:
Maurice Leblanc,
By Lyons & Bissing.
Attorneys.

No. 874,411. PATENTED DEC. 24, 1907.
M. LEBLANC.
SYSTEM OF ELECTRICAL TRANSMISSION AND PROPULSION.
APPLICATION FILED MAR. 31, 1904.
3 SHEETS—SHEET 2.
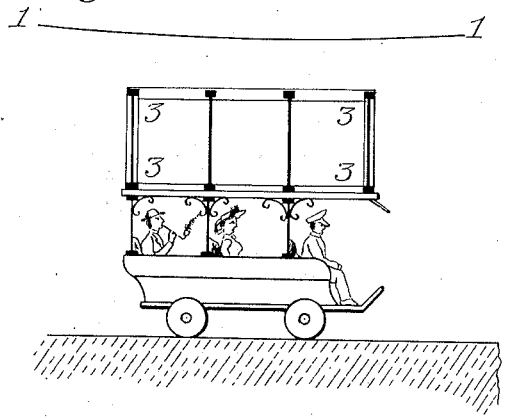
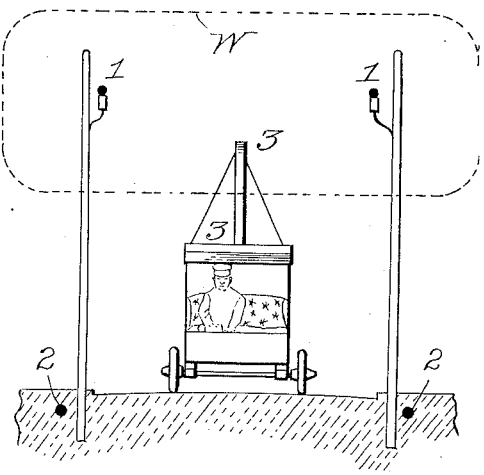
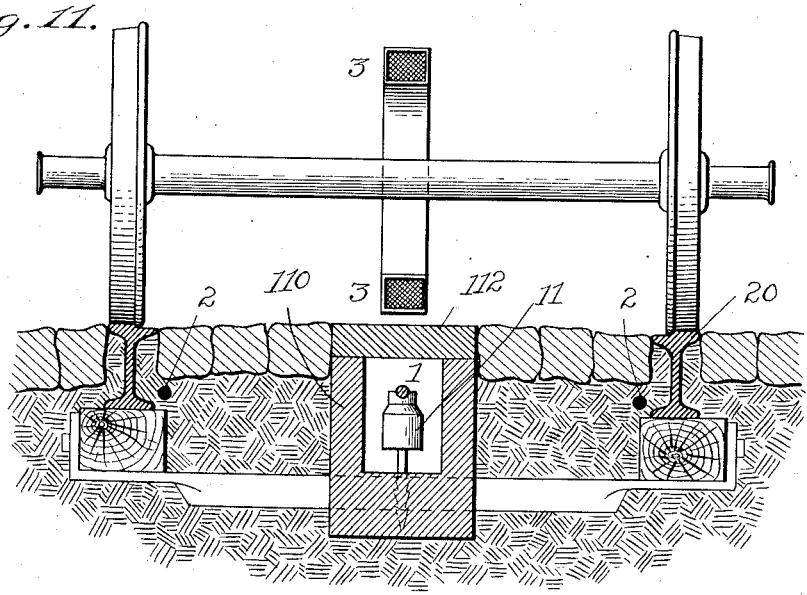
Witnesses:
Edwin L. Yewell.
F. T. Chapman.
Inventor:
Maurice Leblanc,
By Lyons & Bissing,
Attorneys No. 874,411. PATENTED DEC. 24, 1907.
M. LEBLANC.
SYSTEM OF ELECTRICAL TRANSMISSION AND PROPULSION.
APPLICATION FILED MAR. 31, 1904.
3 SHEETS—SHEET 3.
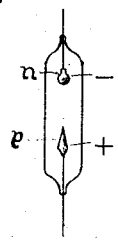
Fig. 7.
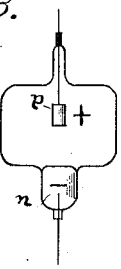
Fig. 8.
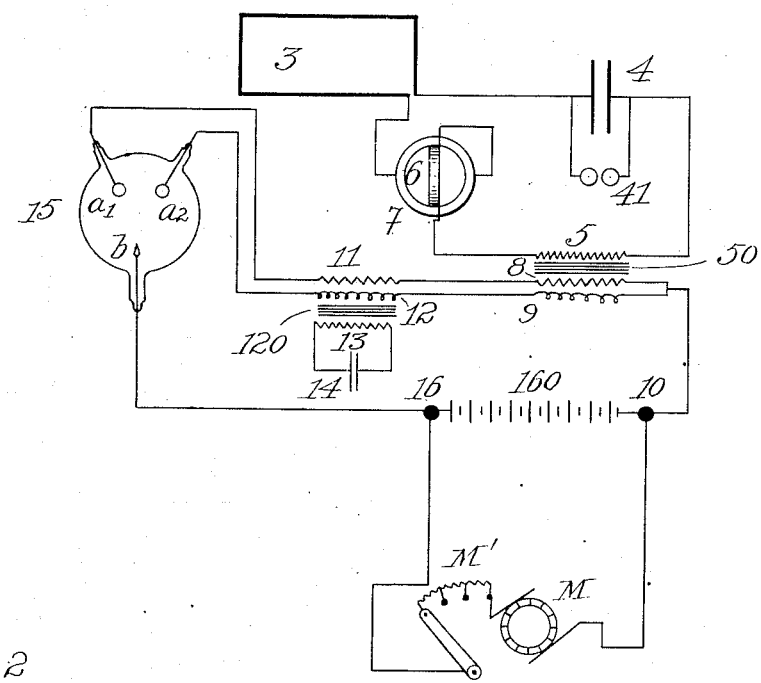
Fig. 9.
Fig. 10.
Witnesses:
Edwin L. Yewell.
F. T. Chapman.
Inventor:
Maurice Leblanc,
By Lyons & Bissing,
Attorneys.

UNITED STATES PATENT OFFICE.

MAURICE LEBLANC, OF PARIS, FRANCE, ASSIGNOR TO WESTINGHOUSE ELECTRIC & MANUFACTURING COMPANY, A CORPORATION OF PENNSYLVANIA.

SYSTEM OF ELECTRICAL TRANSMISSION AND PROPULSION.

No. 874,411.   Specification of Letters Patent.   Patented Dec. 24, 1907.

Application filed March 31, 1904. Serial No. 200,908.

*To all whom it may concern:*

Be it known that I, MAURICE LEBLANC, a citizen of the Republic of France, and resident of Paris, France, have invented a new and useful System of Electrical Transmission and Propulsion, of which the following is a specification.

It has been proposed, in Patent No. 527857, of October 23, 1894, to Hutin & Leblanc, to drive electric tram cars by extending along the track an insulated wire traversed by currents of high frequency and by providing the car with a secondary circuit including a coil serving the purpose of the secondary coil of a transformer, it being understood that the portion of the line wire which is in inductive proximity to the secondary coil corresponds to the primary of a transformer while the secondary coil on the car corresponds to the secondary coil of the transformer. There is, however, this difference over transformers as universally constructed, that in the latter a liminated iron core is provided for interlinking the primary and secondary circuits, while in the system referred to, since the secondary is continually shifting its position, no such iron core can be employed and the magnetic circuit must be closed through the air. But the apparent self induction of the secondary coil having been approximated to zero for the frequency chosen, by any suitable means, it will be plain that any desired amount of electrical energy can be inductively transferred from the line wire to the secondary circuit by taking the frequency of the alternating current sufficiently high and that there will be no considerable loss of energy by wasteful induction in the track rails and metallic bodies within inductive proximity of the line wire, since such metallic bodies have not had their self induction rendered zero for the given frequency and hence offer a high impedance to such high frequency currents.

My present invention, which relates to means for carrying into effect the system just outlined, is not concerned with the production of the high frequency currents which are to be employed, that is to say with the production of high frequency currents the effective intensity and frequency of which are sufficiently constant so that there may be utilized with them all the properties of electrical resonance. Nor does my present invention concern itself with the avoidance of the elevation of the apparent resistance of the line wire due to the Thomson effect, since this may be accomplished by building it of thin, lightly insulated, and twisted wires or of thin tubes. My invention is, however, concerned with the transmission of the high frequency alternating currents over the line wire. In the transmission of alternating currents of the frequency now commonly employed, the length of the electrical transmission line is very short when compared to the length of the electric wave which it carries. But with the frequencies which I employ, the length of the electric wave is short with relation to the length of the transmission line. In fact whether or not the frequency of the alternating current which I employ is high is to be determined, in so far as the present aspect of my invention is concerned, by the criterion whether or not the electric wave corresponding to the given frequency is short with respect to the transmission line employed.

By the present aspect of my invention, I mean its aspect as regards the transmission of energy along a transmission line, as distinguished from the later use of such currents for propelling vehicles. Now in the case of an electric transmission line carrying electrical waves of a wave length which is short with respect to the length of the line, I may say that such lines act with reference to the electrical waves just as sonorous tubes act with relation to sound waves. There will exist the transmitted waves, the reflected waves and, in certain cases, standing waves, with nodes and loops. What is more, the waves which propagate themselves along the line will die down more rapidly when the line gives up energy at various points along its length, as happens when the transmission line is used for a system of propulsion like that heretofore outlined, than when the line gives up energy at its extremity, only, as in the transmission from a generator at one end to a motor at its other end. Finally the line may become the seat of resonance phenomena which give rise to very objectionable super-elevations of voltage.

One of the objects of my invention is to prevent any objectionable super-elevation of voltage in transmission of high frequency currents. Again, when my transmission line is used for electric propulsion, it is necessary to prevent the formation of standing nodes along the line, since at such nodes a vehicle can draw no electrical energy from the line.

Another object of my invention is, then, the prevention of such nodes.

Figure 2:
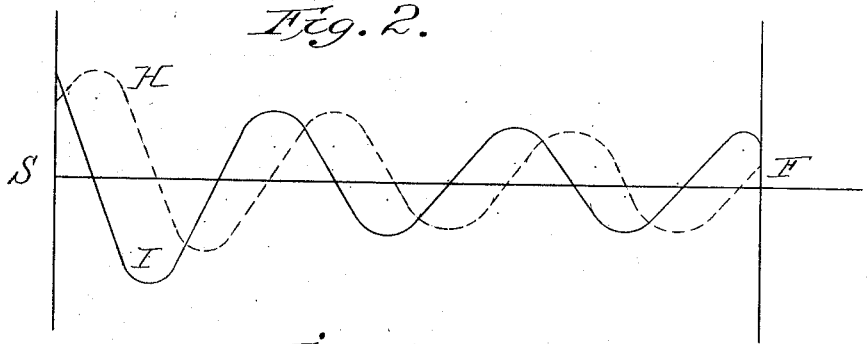
Figure 3:
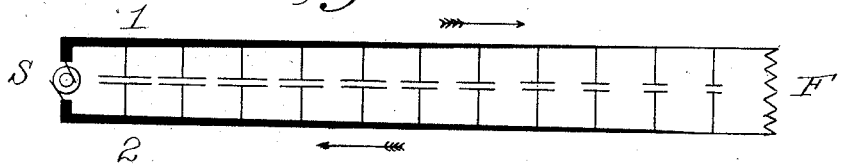
Figure 4:
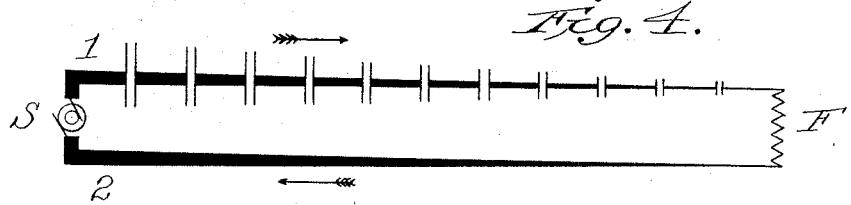

Now to prevent the production of nodes in the transmission line, it is manifestly sufficient to prevent the formation of the reflected waves, that is to say the waves which are reflected from the end of the line distant from the generator back to the generator. This becomes clear when we consider that the nodes accompany the standing waves which are produced by the combination of the transmitted and the reflected waves. In order to prevent the reflection of the electrical waves from the end of the line distant from the generator, I provide the line with a terminal circuit of such resistance and inductance as will absorb all the energy which is transmitted to it. But as this would result in a considerable loss of energy, I furthermore have the circuit which terminates the line do some useful work. For instance, by bending the transmission line in the form of a loop, I may bring the terminal circuit back to the generator and I may thereupon restore the energy in the terminal circuit to the generator by any suitable transforming device. To avoid the super-elevation of voltage along the transmission line, I artificially increase the ratio of its capacity to its inductance at numerous points along the line, the consecutive distances between which are short with reference to a half wave length of the current. But in order that the deadening of the waves may not be increased by this increase in the capacity or decrease in the apparent inductance of the line, I so arrange this artificial increase that the ratio of the inductance to the capacity will grow greater and greater as the generator is receded from. Finally, in order to be able to use a direct current motor on my vehicle, I rectify the alternating currents of high frequency, which are developed in the secondary coil on this vehicle, by means of a system of electric valves which permit currents to pass in a given direction but prevent the passage of current in the opposite direction. All this will become more clear by reference to the drawings in which Figure 1 shows my transmission line. Fig. 2 shows the electrical waves thereon. Figs. 3 and 4 show means for preventing the super-elevation of voltage. Fig. 5 is a side elevation of my car and transmission line. Fig. 6 is a front elevation of the same. Figs. 7 and 8 are details of the electric valves which I may employ. Fig. 9 is a diagram of the circuits of the car. Fig. 10 is a diagram of a modification and Fig. 11 is a sectional elevation showing an underground conductor.

In Fig. 1 I have indicated by the letter S an alternating current generator of high frequency. It will be understood however, that my present invention has nothing to do with the particular construction of this generator so long as it is an apparatus which generates alternating currents of high and practically constant frequency and strength. The outgoing wire 1 leads to one side of the terminal circuit F from the other side of which the return wire 2 leads back to the generator. Designating by $r$, $c$ and $l$ the resistance, the capacity and the induction of the transmission line assumed to be uniformly distributed in units of length and by $\frac{m}{2\pi}$ the frequency of the currents which it transmits, I have found that the terminal circuit should have a resistance R and a co-efficient of apparent self induction L given by the equations $$R = \sqrt{\frac{ml + \sqrt{r^2 + m^2 l^2}}{2mc}}$$

$$mL = \frac{-r}{\sqrt{2mc}} \frac{1}{\sqrt{ml + \sqrt{r^2 + m^2 l^2}}}$$

When these conditions are fulfilled, the terminal circuit is of a character to absorb all the electric wave energy which comes to it, so that there is no reflected wave proceeding from the terminal circuit back to the generator, no standing wave and no stationary node.

As I have before intimated, instead of merely wasting the electrical energy in the terminal circuit in the form of dissipated heat, I prefer to utilize it and a very convenient means for doing this is to have the transmission line in the form of a loop, as shown in Fig. 1. The terminal circuit F may thereupon be used as the primary of an induction coil, the current in the secondary of which may be rectified by means of electric valves in a manner which will be indicated later on and then utilized in any desired manner. The particular mode of employing the energy in the terminal circuit F will most naturally be adapted to the character of the high frequency alternating current generator S.

In Fig. 2 I have indicated by the curve I the values, at a given moment of time, of the intensity of the current along the line and by the curve H the values of the voltage, at the same moment of time, at corresponding points on the line. These two curves have been shown dephased by about 90 degrees. The amplitudes of their oscillations diminish gradually as we get away from the source of electricity, this being due to the deadening forces which are at work. It is to be noted that the electromotive-force of the source S, necessary to maintain the current on the line, depends on the deadening forces opposed to the propagation of the current. But the maximum value of the voltage at any given point along the line depends, on the other hand, primarily upon the resonance of which the line is the seat. I assume that I may neglect $r^2$ with respect to $m^2 l^2$ and that the quantities $r, c, l$, may vary as one moves along the line. The velocity $v$ of propagation of the waves is equal to $\frac{1}{\sqrt{cl}}$ and their law of deadening is such that if we designate by $A_x$ the effective intensity at a point situated at a distance $x$ from the source, and by $A_x'$ the effective intensity at a point situated at a distance $x'$ from the source, the quantities $r, c, l$, remaining constant between the points $x$ and $x'$, then one has (1) $A_x' = A_x \varepsilon - a(x' - x)$ where (2) $a = r\sqrt{\dfrac{c}{l}}$ It can further be shown that the effective voltage $H_x$ at the point $x$ is equal to (3) $H_x = \sqrt{\dfrac{l}{c}} A_x$ In order to diminish the deadening of the waves, it is manifestly desirable to diminish the value of the fraction $\dfrac{c}{l}$ that is to say it is desirable either to diminish the capacity of the line or to increase its self induction. This is evident from a comparison of the equations (1) and (2). But an examination of the equation (3) shows that by diminishing the ratio of the capacity to the self induction of the transmission line, which means that we increase the ratio of the self induction to the capacity, the voltage which the line has to support is also increased. Now it so happens that in nearly all practical cases, the natural value of the ratio of the capacity to the self induction will be sufficiently small so that one may attain, at a reasonable copper cost, a sufficiently great distance of electrical transmission without an undue deadening of the intensity of the current waves along and at the end of the line. But, on the other hand, in practical cases, with an unmodified transmission line, it will be found that the super-elevation of voltage along the line will be so high as to render the insulation of the conductors difficult. For this reason, that is for the purpose of preventing the super-elevation of voltages along the line, I artificially decrease the ratio of the self induction to the capacity of the line, at points along the line, the consecutive distances between which points are short with reference to a half wave length of the current. Since we are dealing with the ratio of the self induction to the capacity, that is with the fraction $\dfrac{1}{c}$, it is manifest that we can change its value by varying either its enumerator or its denominator. I have, therefore, in Fig. 3 shown a series of condensers in shunt across the outgoing and return conductor at points along the line, the consecutive distances between which are short with respect to a half wave length and, in this way, I have increased the capacity $c$ of the line which means that I have decreased the ratio of the self induction to the capacity. This results in diminishing the voltage along the line. In Fig. 4, on the other hand, I have shown condensers in series in the outgoing line by which means I have, in effect, reduced the apparent self induction $l$ of the line. This means that I have again decreased the ratio of the self induction to the capacity of the line and with it the voltage which the line is compelled to support. But in order that the deadening of the waves may not become more and more rapid as we recede from the prime source of energy along the transmission line, it will be observed that I have decreased the size of the added condensers as we pass along the line away from the generator, toward the line terminal. This means that the ratio of the self induction to the capacity is gradually varied in an increasing manner along the line, as we get toward the line terminal, and this at points the consecutive distances between which are short compared with half a wave length of the current. I remark again that this gradual variation in an increasing manner of the ratio of the self induction to the capacity toward the line terminal may be brought about either by increasing the self induction, apparent or real, or by diminishing the capacity. I need only add that in order to diminish the copper cost, the transmission line is made of diminishing cross section toward the line terminal since this part of the line carries a current of less effective intensity.

I have shown in Fig. 5, an electrical tram car or automobile, the distinguishing characteristic of which, so far as shown, is a large rectangular frame. This frame carries the secondary coil 3, before described, inductively receiving, on the one hand, electrical energy from the line wire 1, which acts as a primary, and transmitting in turn the electrical energy thus received, in a manner which will appear later on, to the motor on the tram car.

In Fig. 6 the two line wires 1, which are supported upon posts, are coupled in parallel, thus constituting, in effect, a single line wire and their return wires 2, also coupled in parallel, are embedded at the foot of the posts. The path of the magnetic flux, generated by the line wires 1, is shown by the dotted loop W and is seen to traverse the secondary coil 3. The line wires 1 are insulated but the return wires 2 need not be insulated.

In Fig. 11, I have shown a single line wire 1 resting on the top of an insulator 11, which is protected by a boxing 110 of concrete and covered by flag stones 112. The return wires 2 are embedded near the rails 20 upon which the tram car travels. The secondary 3 is supported in any convenient manner upon the vehicle in a plane which preferably passes through the line wire 1. In order that the line wire 1, in Fig. 11, may act most efficiently as a primary, inductively transmitting electrical energy to the secondary 3 on the tram car, it is manifestly necessary that it should be located as shown, that is to say it should lie in a plane which passes through the line wire 1. So long as the tram car remains upon the tracks 20, this condition will necessarily be fulfilled. But in the case of the automobiles shown in Figs. 5 and 6, which do not travel upon tracks, it will be manifestly desirable to permit these automobiles to depart from the inductive region of the transmission line 1, as for instance to avoid an obstruction or to turn out for another vehicle. In order to render this possible, I have added a storage battery to the automobile equipment, which storage battery is arranged to be charged during the period when the automobile is receiving energy from the line wires 1 and is arranged to feed the motor on the automobile at other times. The specific arrangement of this storage battery will be described farther on.

I have stated at the outset of this specification, and it is fully described in Patent No. 527,857 there referred to, that for the purpose of transmitting electrical energy from a line wire to a secondary coil without the intervention of an iron core, it is necessary for economy to use high frequency currents. Only when such high frequency currents are employed will the dissipation losses in extraneous conductors be small. Under this aspect of my invention I use the term high frequency as meaning a frequency sufficiently high to avoid undue dissipation of the current energy in extraneous conductors. But when such high frequency currents are employed upon the line wire, it follows that high frequency currents will be generated in the secondary circuit 3 and, unless these currents are then transformed, the high frequency currents will be supplied to the motor. It happens, however, that there is, at the present day, no known form of motor which is capable of efficiently utilizing high frequency currents. For this reason I have employed the arrangements of circuits diagrammatically indicated in Fig. 9, whereby I first approximate to zero, for the employed frequency, the coefficient of apparent self induction of the secondary coil 3 by a suitable condenser and thereupon transform this alternating high frequency current into a direct current by means of electric valves. In this manner I am permitted to use any known form of direct current motor to drive the vehicle. The use of electric valves in this connection forms a peculiarly useful means for utilizing upon a vehicle the energy of high frequency currents upon a line wire and I regard this as an important feature of my invention.

Examining Fig. 9, we find that the secondary coil 3 is in circuit with a condenser 4, the capacity of which is so chosen that for the given frequency of the alternating current, the co-efficient of apparent self induction of the circuit including the coil 3 will be rendered zero or as nearly zero as may be desirable for commercial purposes. The condenser is shunted by a spark gap 41 which prevents the puncturing of the condenser. I further include, in the circuit of the secondary coil 3, the primary 5 of a transformer 50 and I may finally include in this circuit the two coils 6 and 7, in series with each other and which are movable with respect to each other, for the purpose of varying the co-efficient of apparent self induction of the circuit 3, 4, 5, 6, 7, in which they find themselves. The coils 6, 7, constitute one type of variable reactance which I may employ.

The transformer 50 has two secondary coils 8 and 9 each of the same number of turns but oppositely wound. These are connected, at one end, to the binding post 10. Connected to the other end of the coil 8 is a coil 11 and connected to the other end of the coil 9 is a coil 12. These two coils 11 and 12 also each have the same number of turns but are oppositely wound. The other terminals of the coils 11 and 12 are respectively connected to the terminals $a^1$, $a^2$, of like sign, of an electric valve 15. Coöperating with these two terminals $a^1$ and $a^2$, of like sign, is a valve terminal $b$ of opposite sign connected to the binding post 16. A secondary battery is inserted between the binding posts 16 and 10 and the motor M, which drives the vehicle, and its rheostat M' are connected up in shunt of the secondary battery. Briefly describing these electric valves, two types of which have been shown in Figs. 7 and 8, I may say that they may be constructed in a variety of ways. Thus, for instance, they may consist of a vacuum tube containing two opposite electrodes which are dissimilar either in the nature of the substances which compose them or in their geometric form. By way of example, the positive electrode $p$ may be made pointed and the negative electrode $n$ may be made globular. This has been shown in Fig. 7. Or the negative electrode may consist of a globule of mercury and the positive electrode may be made of a bell of steel. This unusually efficient form of electric valve is shown in Fig. 8. In any case, if an alternating current is impressed upon the terminals of the electric valve, current in one direction is allowed to flow and the current in the opposite direction is, in effect, suppressed. It will now be plain that during one half period of the alternating current which is induced in the secondary coil 3, the primary coil 5, which is in circuit therewith, will induce into the secondary coil 8 of the transformer 50 current in such a direction as will enable it to flow across the valve terminals $b—a^1$. During the next half period of current, on the other hand, the current which is induced in the secondary 8 by the primary 5, being in a direction opposite to that just referred to, will not be permitted to flow. But during this half period, the current which the primary 5 induces in the secondary 9 of the transformer 50, may freely pass from the valve terminal $b$ to the valve terminal $a^2$. It thus happens that each half wave of current in the primary 5 causes current in a given direction to flow in the circuit containing the terminals 10 and 6, to drive the direct current motor and to charge the storage battery.

It is manifest that the successive passage of currents in the same direction in the secondary coils 8 and 9 will produce the same effect upon the primary coil 5 as the passage of an alternating current in either one of the coils 8 or 9. The same remark applies to the coils 11 and 12 with relation to the coil 13. It is therefore manifest that matters will proceed so far as the mutual induction of these coils is concerned precisely as if they were but a single circuit 8, 11, carrying an alternating current instead of there being, as is actually the case, two parallel circuits 8, 11, and 9, 12, each carrying successfully one half wave of the alternating current.

By choosing the capacity of the condenser 14 in circuit with the coil 13 in such a manner that the co-efficient of apparent self induction of the circuit formed by the union of the coils 8, 11, is zero, it will be apparent, from what is known of transformer action, that the voltage or electrical pressure developed between the binding posts 10, 16, is proportional to the strength or intensity of the current in the circuit containing the coils 3 and 5. In order to control the voltage across the terminals 10 and 16, it is therefore merely necessary to control the intensity of the current in circuit 3, 4, 5, 6, 7, and this may be readily done by varying the co-efficient of self induction or the reactance of this circuit by moving the coil 6 with reference to the coil 7.

As has been previously pointed out, the secondary battery 160 is peculiarly necessary in case of automobiles which may be compelled to leave the region of inductive effect of the line wire 1, as for instance, in turning out for another vehicle. It is necessary, however, when employing a secondary battery, to have an approximately constant difference of potential between its terminal binding posts. Since, however, the co-efficient of mutual induction between the secondary coil 3 and the line wire 1 is constantly changing, it will be necessary, in order to keep constant the value of the current induced in the coil 3, and therefore the voltage across the terminals 10—6, that the co-efficient of self induction or the reactance of the circuit 3, 4, 5, 6, 7, be suitably varied, as for instance by manually manipulating the coils 6, 7, with relation to each other. It is also evident that as the vehicle approaches the terminal circuit, where its secondary coil 3 will be subjected to the inductive action of currents of less intensity, that the co-efficient of self induction of the circuit 3, 4, 5, 6, 7, should be decreased. The speed of the motor may be controlled by any type of rheostat M'.

In case we are dealing with tram cars which run along tracks and which will therefore always be within the inductive influence of the line wire 1, the storage battery will be dispensed with and the motor will be inserted directly between the terminals 16 and 10 as shown in Fig. 10. In this case the speed of the motor will be changed by varying the relation of the coils 6, 7.

I have spoken throughout this specification, of condensers as a peculiar useful means for adding capacity to a line either for the purpose of increasing the capacity or of diminishing the self induction. But it is now well understood in the art that a number of other types of apparatus have this same property and I shall speak of all such types of apparatus under the generic title of a capacitance or capacitances.

1. An electrical transmission line, carrying alternating currents of a wave length which is short with reference to the length of the line, which has the ratio of its capacity to its self induction artificially increased at points along the line in a manner to prevent the superelevation of voltage, the consecutive distances between which points are short with reference to a half wave length of the current, substantially as described.

2. An electrical transmission line, carrying alternating currents of a wave length which is short with reference to the length of the line, which has the ratio of its self induction to its capacity gradually varied in an increasing manner toward the line terminal, at points along the line the consecutive distances between which are short with reference to a half wave length of the current, substantially as described.

3. An electrical transmission line, carrying alternating currents of a wave length which is short with reference to the length of the line, and capacitances added at points along the line to artificially increase the ratio of its capacity to its self induction in a manner to prevent the superelevation of voltage, the consecutive distance between the capacitances being short with reference to a half wave length of the current, substantially as described.

4. An electrical transmission line carrying alternating currents of a wave length which is short with reference to the length of the line, and capacitances of gradually diminishing capacity at points along the line to artificially increase the ratio of its capacity to its self induction, and to gradually vary the ratio of its self induction to its capacity in an increasing manner toward the line terminal, the consecutive distances between which points are short with reference to a half wave length of the current, substantially as described.

5. An electrical transmission line, carrying alternating currents of a wave length which is short with reference to the length of the line, comprising a terminal circuit of a character to absorb the electrical energy transmitted to it, whereby reflected waves are avoided, substantially as described.

6. An electrical transmission line, carrying alternating currents of a wave length which is short with reference to the length of the line, comprising a terminal circuit having a resistance and a co-efficient of apparent self induction determined to avoid reflected waves, substantially as described.

7. The combination of an electrical transmission line, and an electrical generator impressing thereon alternating currents of a wave length which is short with reference to the length of the line, the transmission line comprising a terminal circuit, in juxtaposition to the generator, of a character to absorb the electrical energy transmitted to it, whereby reflected waves are avoided and the absorbed electrical energy may be utilized, substantially as described.

8. In a system of electric propulsion, a line wire carrying high frequency currents, and a vehicle carrying an electric circuit in inductive proximity thereto which has its co-efficient of self induction approximated to zero for the given frequency, an electric valve for rectifying the induced alternating currents, and a motor for driving the vehicle actuated by the rectified currents, substantially as described.

9. In a system of electric propulsion, a line wire carrying high frequency currents, and a vehicle carrying an electric circuit, in inductive proximity thereto, which has its co-efficient of self induction approximated to zero for the given frequency and which includes a variable reactance, an electric valve for rectifying the induced alternating current, and a motor for driving the vehicle actuated by the rectified currents, substantially as described.

10. In a system of electric propulsion, a line wire carrying high frequency currents, and a vehicle carrying an electric circuit, in inductive proximity thereto, which has its co-efficient of self induction approximated to zero for the given frequency and which includes a variable reactance, an electric valve in a circuit which is inductively related to that last specified for rectifying the currents, and a storage battery charged by the rectified current, substantially as described.

11. In a system of electric propulsion, a line wire carrying high frequency currents and a vehicle carrying an electric circuit, in inductive proximity thereto, which has its co-efficient of self induction approximated to zero for the given frequency and which includes a variable reactance, an electric valve in a circuit which is inductively related to that last specified for rectifying the currents, and a motor for driving the vehicle actuated by the rectified current, substantially as described.

12. In a system of electric propulsion, a line wire carrying high frequency currents, and a vehicle carrying an electric circuit, in inductive proximity thereto, which has its co-efficient of self induction approximated to zero for the given frequency, an electric valve in a circuit of approximately zero apparent self induction which is inductively related to that last specified for rectifying the currents, and a motor for driving the vehicle actuated by the rectified currents, substantially as described.

13. In a system of electric propulsion, a line wire carrying high frequency currents, and a vehicle carrying an electric circuit, in inductive proximity thereto, which has its co-efficient of apparent self induction approximated to zero for the given frequency and which includes a variable reactance, an electric valve in a circuit of approximately zero apparent self induction which is inductively related to that last specified for rectifying the current, and a motor for driving the vehicle actuated by the rectified currents, substantially as described.

14. The process of transmitting electrical energy, which consists in impressing upon a transmission line high frequency alternating currents of a wave length which is short with reference to the length of the line, and counteracting the tendency to elevation of voltage by artificially increasing the ratio of the capacity to the self induction at points along the line, the consecutive distances between which are short with reference to a half wave length of the current, substantially as described.

15. The process of transmitting electrical energy, which consists in impressing upon a transmission line alternating currents of a wave length which is short with reference to the length of the line, and counteracting the tendency to an increasing deadening of the waves toward the line terminal by gradually varying in an increasing manner, toward the line terminal, the ratio of its self induction to its capacity and this at points the consecutive distances between which are short with reference to a half wave length of the current, substantially as described.

16. The process of transmitting electrical energy, which consists in impressing, upon one end of a transmission line, alternating currents of a wave length which is short with reference to the length of the line, and absorbing the electrical energy transmitted to the other end of the line, for the purpose of avoiding reflected waves, substantially as described.

17. The process of transmitting electrical energy, which consists in impressing by means of an electrical generator upon one end of a transmission line, alternating currents of a wave length which is short with reference to the length of the line, absorbing the electrical energy which is transmitted to the other end of the line, and utilizing the energy thus absorbed, substantially as described.

18. The process of transmitting electrical energy which consists in impressing upon a transmission line alternating currents of a wave length which is short with reference to the length of the line, and counteracting the tendency to an elevation of voltage and to the increasing deadening of the waves toward the line terminal, by artificially increasing the ratio of the capacity to the self induction at points along the line, the consecutive distances between which are short with reference to a half wave length of the current, and by gradually varying in an increasing manner the ratio of the self induction to the capacity at these points as the line terminal is approached, substantially as described.

In testimony whereof I have signed my name to this specification in the presence of two subscribing witnesses.

MAURICE LEBLANC.

Witnesses:
 ALBERT DELAS,
 HANSON C. COXE.